(12) United States Patent
Chinitz et al.

(10) Patent No.: US 11,028,875 B1
(45) Date of Patent: Jun. 8, 2021

(54) ASSEMBLY WITH A HOUSING AND AN OUTER BEARING RACE THAT ARE FORMED OF DISSIMILAR METALS, THE ASSEMBLY BEING CONFIGURED TO RETAIN THE OUTER BEARING RACE TO THE HOUSING OVER A RANGE OF TEMPERATURES

(71) Applicant: AMERICAN AXLE & MANUFACTURING, INC., Detroit, MI (US)

(72) Inventors: Steven Chinitz, Plymouth, MI (US); Brian McCormick, Bloomfield Township, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 16/829,052

(22) Filed: Mar. 25, 2020

(51) Int. Cl.
*F16C 19/52* (2006.01)
*F16C 19/36* (2006.01)
*F16C 19/54* (2006.01)

(52) U.S. Cl.
CPC .......... *F16C 19/525* (2013.01); *F16C 19/364* (2013.01); *F16C 19/547* (2013.01); *F16C 2361/31* (2013.01)

(58) Field of Classification Search
CPC .... F16C 19/364; F16C 19/525; F16C 19/547; F16C 33/62; F16C 35/045; F16C 35/06; F16C 35/067; F16C 35/12; F16C 2361/31
USPC ................................................. 384/493, 557
See application file for complete search history.

(56) References Cited

U.S. PATENT DOCUMENTS

| | | | | |
|---|---|---|---|---|
| 3,326,613 A | * | 6/1967 | Renker | F16C 25/06 384/493 |
| 6,135,641 A | * | 10/2000 | Smith | F16C 19/163 384/493 |
| 2001/0046340 A1 | * | 11/2001 | Shimomura | F16C 25/08 384/548 |
| 2009/0080824 A1 | | 3/2009 | Joki et al. | |

* cited by examiner

*Primary Examiner* — James Pilkington
(74) *Attorney, Agent, or Firm* — Burris Law, PLLC

(57) ABSTRACT

An assembly with a housing, a bearing, which is received in a bearing bore formed in the housing, and an annular compensation member. The housing and the compensation member are formed of materials having a larger coefficient of linear thermal expansion than a material from which the outer bearing race is formed. The compensation member is fixedly coupled to the housing and mounted about an outer bearing race of the bearing. The compensation member is configured to grow in a radial direction into contact with an inside circumferential surface of the outer bearing race when a temperature of the assembly increases from a first predetermined temperature to a second predetermined temperature.

22 Claims, 3 Drawing Sheets

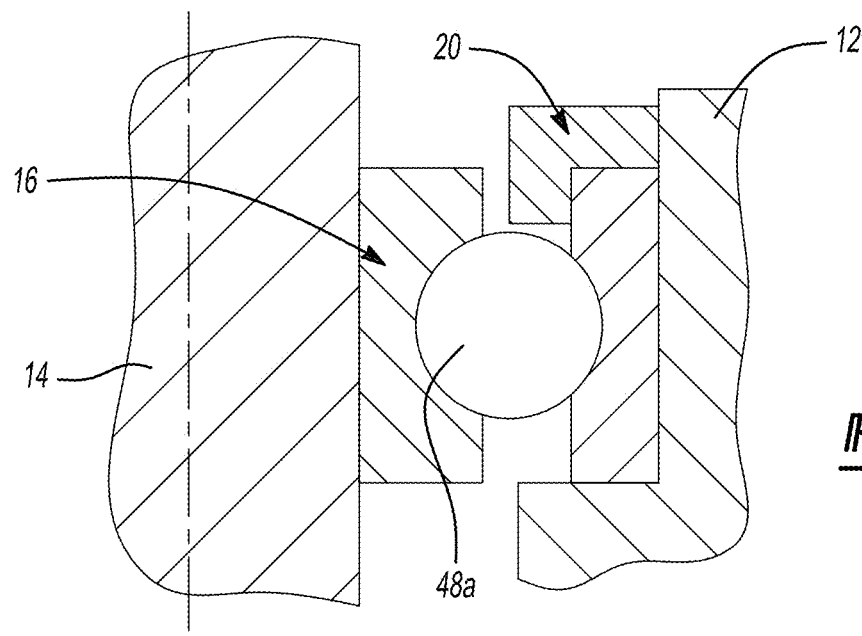
_Fig-4_
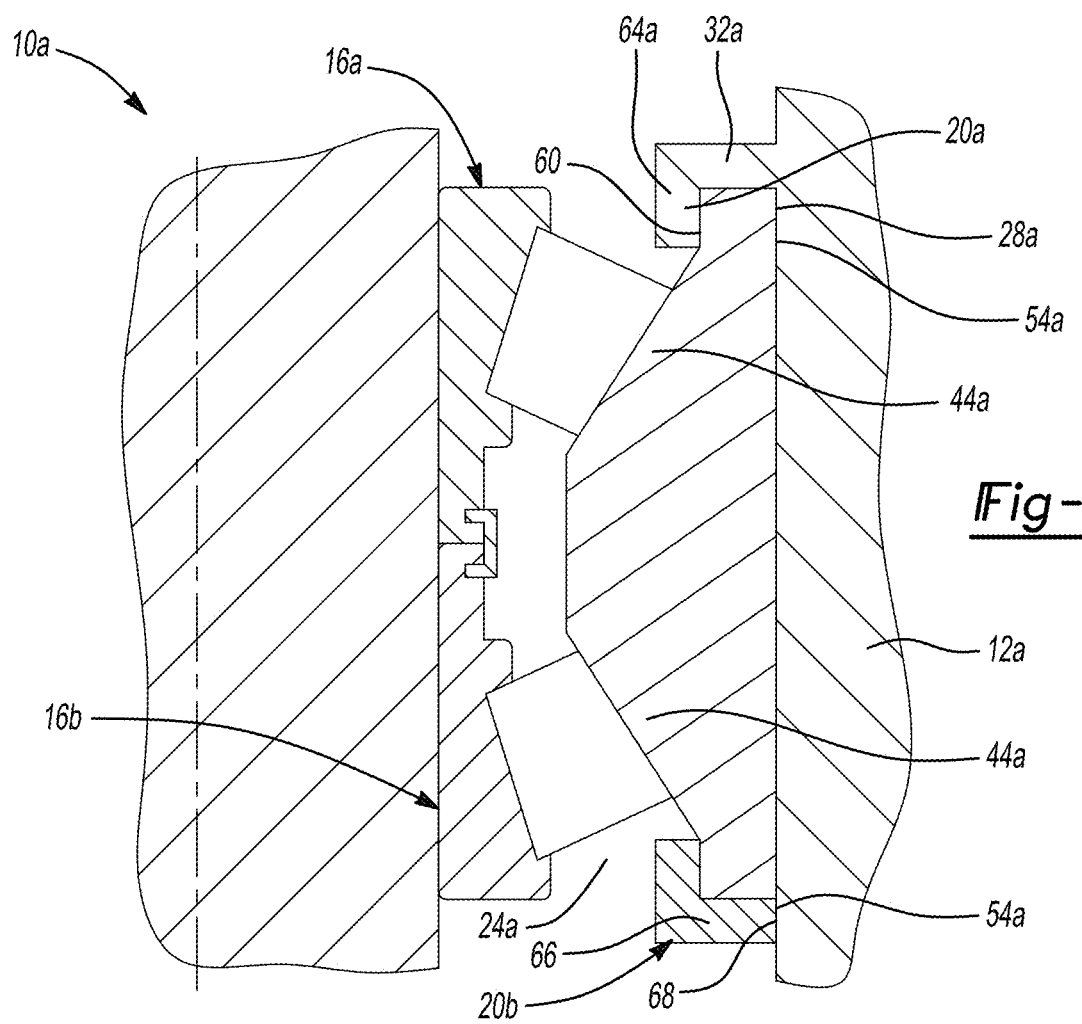
_Fig-5_

ASSEMBLY WITH A HOUSING AND AN OUTER BEARING RACE THAT ARE FORMED OF DISSIMILAR METALS, THE ASSEMBLY BEING CONFIGURED TO RETAIN THE OUTER BEARING RACE TO THE HOUSING OVER A RANGE OF TEMPERATURES

FIELD

The present disclosure relates to an assembly with a housing and an outer bearing race that are formed of dissimilar materials in which the assembly is configured to retain the outer bearing race to the housing over a range of temperatures.

BACKGROUND

This section provides background information related to the present disclosure which is not necessarily prior art.

Rolling element bearings are employed in various assemblies to support one component, such as a shaft, for rotation relative to another component, such as a housing. Such bearings can include an outer bearing race, which is typically press-fit to the housing, an inner bearing race, and a plurality of rolling elements that are disposed radially between the outer and inner bearing races.

When the housing and the outer bearing race are formed of materials having similar coefficients of linear thermal expansion, significant changes in the temperature of the assembly have little effect on the engineering fit between the housing and the outer bearing race. In this regard, the outer bearing race would grow or increase in diameter in response to a significant elevation in the temperature of the assembly. However, the size of the bore in the housing into which the outer bearing race is fitted would grow or increase in diameter by a similar amount and as such, the force exerted between the housing and the outer circumferential surface of the outer bearing race would not change significantly as the temperature of the assembly changed.

When the housing and the outer bearing race are formed of materials having significantly different coefficients of thermal expansion, however, significant changes in the temperature of the assembly will have a significant effect on the force that is exerted between the housing and the outer circumferential surface of the outer bearing race. For example, in a situation where the housing is formed of an aluminum alloy, the outer bearing race is formed of steel, and the two components are sized such that the outer bearing race is engaged to the housing in a press-fit manner when the assembly is at room temperature, the force exerted between the housing and outer circumferential surface of the outer bearing race will decrease as the temperature of the assembly increases from room temperature due to the fact that the coefficient of linear thermal expansion of aluminum is approximately twice that of steel. At significantly elevated temperatures, the force exerted between the housing and the outer bearing race can potentially decrease to a point where the outer bearing race is able to rotate relative to the housing. At significantly reduced temperatures, the force exerted between the housing and the outer bearing race can potentially increase to a point where the outer bearing race and/or the housing fracture. Consequently, it can be difficult to ensure that a desired force is exerted between a housing and an outer circumferential surface an outer bearing race when the coefficients of linear thermal expansion of the housing and the outer bearing race are significantly different and the assembly is subject to operation through a wide range of temperatures.

SUMMARY

This section provides a general summary of the disclosure, and is not a comprehensive disclosure of its full scope or all of its features.

In one form, the present disclosure provides an assembly that includes a housing, a bearing and an annular compensation member. The housing defines a bore and is formed of a first material having a first coefficient of linear thermal expansion. The bearing has an outer bearing race, an inner bearing race, and a plurality of roller elements that are disposed radially between the outer and inner bearing races. The outer bearing race is received in the bore and is formed of a second material having a second coefficient of linear thermal expansion. The outer bearing race defines an annular race on which the rolling elements are rollingly disposed. The annular compensation member is fixedly coupled to the housing and has an outside circumferential surface that is received about an inside circumferential surface of the outer bearing race. The annular compensation member is formed of a third material having a third coefficient of linear thermal expansion. A fit between an outside circumferential surface of the outer bearing race and an inside circumferential surface of the bore in the housing fixedly couples the outer bearing race to the housing when the temperature of the assembly is at or below a first predetermined temperature. The outside circumferential surface of the outer bearing race is disengaged from the inside circumferential surface of the bore when the temperature of the assembly is at or above a second predetermined temperature that is greater than the first predetermined temperature. A fit between the inside circumferential surface of the outer bearing race and the outside circumferential surface of the first annular compensation member fixedly couples the first outer bearing race to the first annular compensation member when the temperature of the assembly is at or above the second predetermined temperature to thereby inhibit axial and rotational movement of the first outer bearing race relative to the housing.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a section view of a portion of a second assembly constructed in accordance with the teachings of the present disclosure; and FIG. 5 is a section view of a portion of a third assembly constructed in accordance with the teachings of the present disclosure.

DETAILED DESCRIPTION

Figure 1:
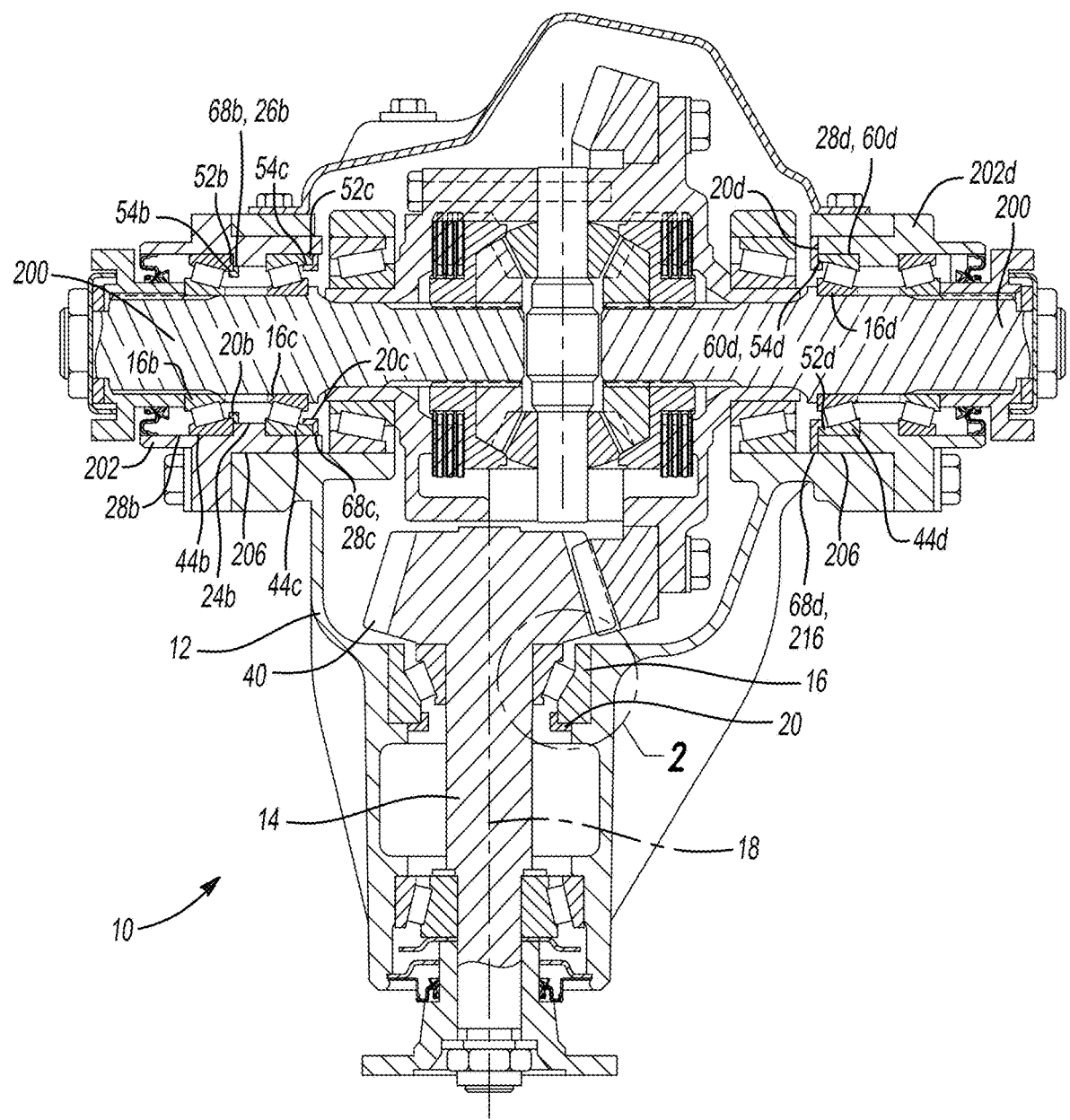
FIG. 1 is a sectional view of an exemplary assembly constructed in accordance with the teachings of the present disclosure.

With reference to FIG. 1, an exemplary assembly constructed in accordance with the teachings of the present disclosure is generally indicated by reference numeral 10. The assembly 10 includes a housing 12, a shaft 14, and a bearing 16, which supports the shaft 14 for rotation about a rotational axis 18 relative to the housing 12, and an annular compensation member 20. In the particular example provided, the assembly 10 is an axle assembly, but it will be appreciated that the teachings of the present disclosure have application to other assemblies, including engines, transmissions and other components that may or may not be utilized in a vehicle powertrain or drivetrain.

Figure 2:
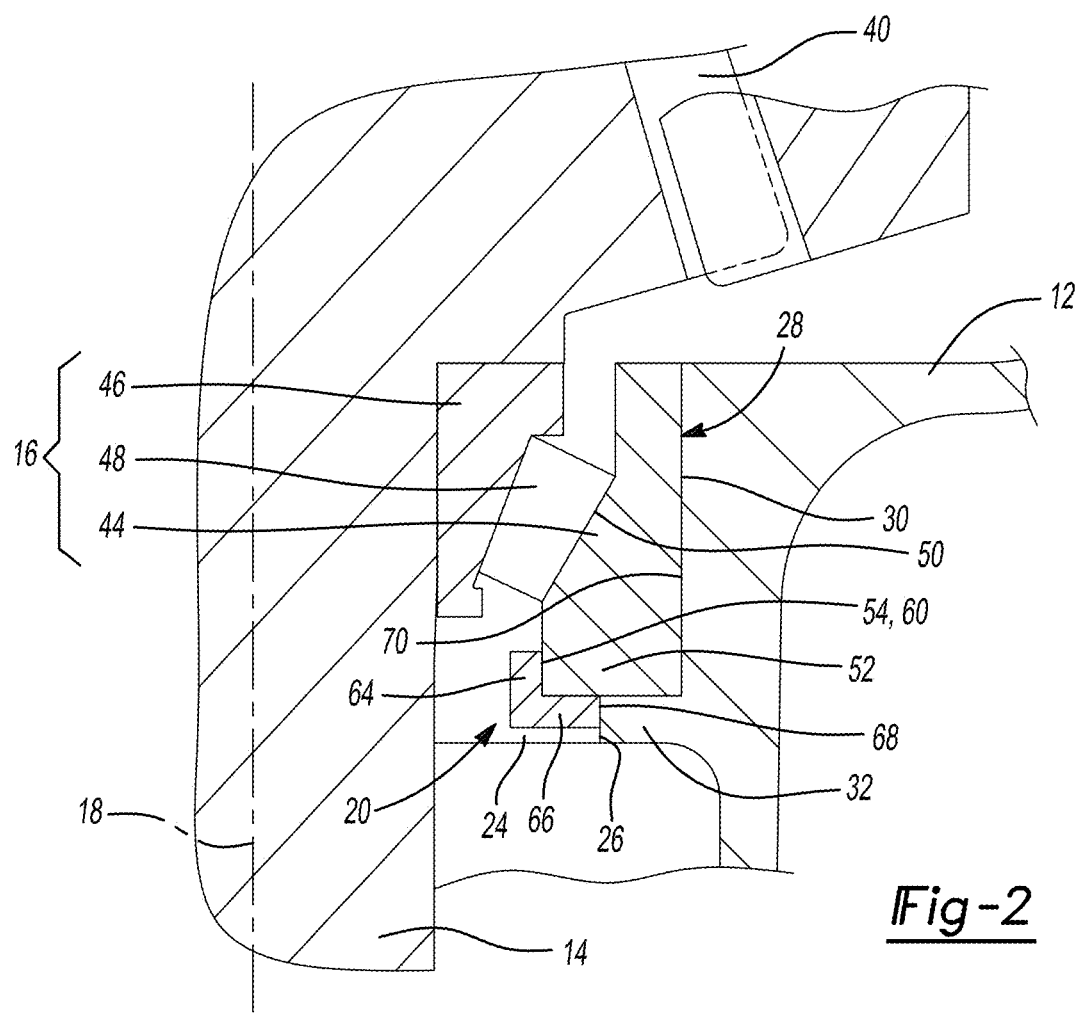
FIG. 2 is an enlarged portion of FIG. 1.

With reference to FIG. 2, the housing 12 defines a bore 24 that is sized to receive the bearing 16 and the compensation member 20. The bore 24 defines a through-bore portion 26 and a counterbore portion 28. The through-bore portion 26 is sized to a first diameter, while the counterbore portion 28 is sized to a second diameter that is larger than the first diameter. The counterbore portion 28 defines a circumferentially extending surface 30, which is concentric with the through-bore portion 26, and an annular shoulder 32 that is oriented perpendicular to the circumferentially extending surface 30. The housing 12 is formed of a first material having a first coefficient of linear thermal expansion. The first material can be any type of material, such as a non-ferrous material. In the example provided, the first material is an aluminum alloy and has a coefficient of linear thermal expansion of about $23 \times 10^{-6}$ degrees Celsius when the first material is at a temperature of 20 degrees Celsius.

The shaft 14 is received in the bore 24 and is fixedly coupled to an input pinion gear 40 in the example provided. The bearing 16 is mounted to the housing 12 and the shaft 14 and supports the shaft 14 for rotation about a rotational axis 18 relative to the housing 12. The bearing 16 comprises an outer bearing race 44, an inner bearing race 46, and a plurality of rolling elements 48 that are disposed radially between the outer and inner bearing races 44 and 46. The rolling elements 48 can comprise any type of rolling element, such as rollers or spherical balls 48a (FIG. 4), but are depicted as being tapered rollers in the particular example shown. The inner bearing race 46 can be non-rotatably mounted to the shaft 14 in a conventional manner, such as via press-fit engagement. The outer bearing race 44 is received in the counterbore portion 28 of the bore 24 in the housing 12 and is abutted axially against the annular shoulder 32. In the example shown, the outer bearing race 44 defines an annular race 50 and a circumferentially extending rib 52. The annular race 50 is formed on an inner circumferential surface of the outer bearing race 44 and the first rolling elements 48 are rollingly disposed on the annular race 50. The rib 52 is disposed radially inwardly of the annular race 50 and defines an inside circumferential surface 54 of the outer bearing race 44. The rib 52 extends circumferentially about the full diameter of the outer bearing race 44 in the example shown, but it will be appreciated that the rib 52 could be formed somewhat differently. For example, the rib 52 could be formed in a discontinuous manner with one or more interruptions or notches being formed in the inside circumferential surface 54 of the outer bearing race 44.

The outer bearing race 44 is formed of a second material that is different from the first material. The second material has a coefficient of linear thermal expansion that is less than the coefficient of linear thermal expansion for the first material. For example, a ratio of the first coefficient of linear thermal expansion to the second coefficient of linear thermal expansion can be greater than or equal to 1.75. In the example provided, the second material is a type of steel and the second coefficient of linear thermal expansion is about $12 \times 10^{-6}$ degrees Celsius when the first material is at a temperature of 20 degrees Celsius. As such, the ratio of the first coefficient of linear thermal expansion to the second coefficient of linear thermal expansion is about 1.93 in the example provided.

Figure 3:
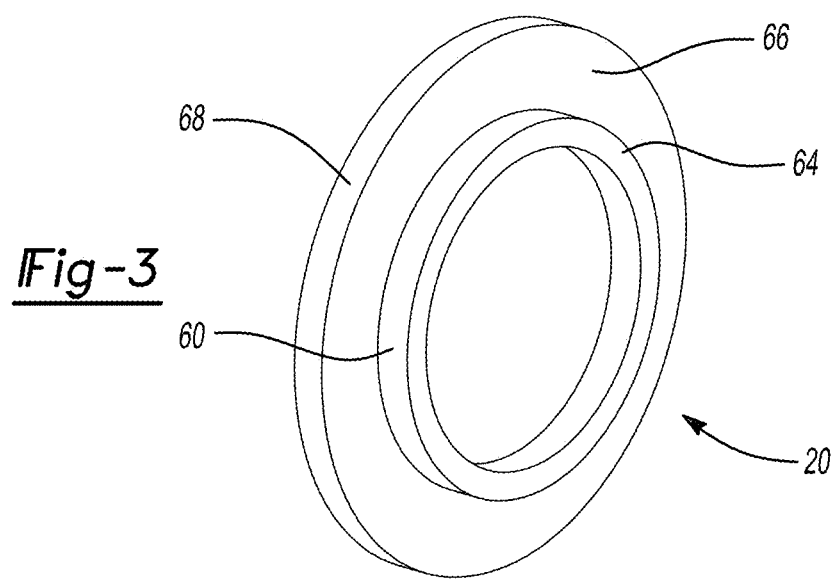
FIG. 3 is a perspective view of a portion of the assembly of FIG. 1 illustrating an annular compensation member in more detail.

With reference to FIGS. 2 and 3, the compensation member 20 is fixedly coupled to the housing 12 and defines an outside circumferential surface 60 that is disposed about the inside circumferential surface 54 of the rib 52 on the outer bearing race 44. The compensation member 20 is formed of a third material having a third coefficient of linear thermal expansion. The third material can be selected such that a ratio of the third coefficient of linear thermal expansion to the first coefficient of linear thermal expansion is within a range of 0.9 to 1.1. In the example provided, the third material is an aluminum alloy with a coefficient of linear thermal expansion of about $23 \times 10^{-6}$ degrees Celsius when the first material is at a temperature of 20 degrees Celsius and as such, the ratio of the third coefficient of linear thermal expansion to the first coefficient of linear thermal expansion is 1.0 in this example.

In the particular example provided, the compensation member 20 is a discrete component that is assembled to the housing 12 and includes a tubular portion 64 and a flange 66. The outside circumferential surface 60 of the compensation member 20 is formed on the tubular portion 64 in this example. The flange 66 extends radially outwardly from the tubular portion 64 and is received into the bore 24. A radially outer surface 68 of the flange 66 can be engaged to a corresponding surface of the bore 24. In the example shown, the radially outer surface 68 of the flange 66 is engaged to the circumferentially extending surface 30 of the through-bore portion 26 of the bore 24 in a press-fit or interference fit manner.

Returning to FIG. 2, the bore 24 in the housing 12 (i.e., the diameter of the circumferentially extending surface 30 of the counterbore portion 28 in the example provided), the outer and inner diameters of the outer bearing race 44 (i.e., the diameter of an outer circumferential surface 70 of the outer bearing race 44 and the diameter of the inside circumferential surface 54 of the rib 52, respectively, in the example provided), and the compensation member 20 (i.e., the outside circumferential surface 60 of the compensation member 20 in the example provided) are configured so that the compensation member 20 cooperates with the housing 12 and the outer bearing race 44 to provide a means for securing the outer bearing race 44 to the housing 12 in a manner that attenuates thermally-induced changes in a fit between the housing 12 and the outer bearing race 44 that result from differences in coefficients of linear thermal expansion of the first and second materials.

In this example, the outer circumferential surface 70 of the outer bearing race 44 and the circumferentially extending surface 30 of the counterbore portion 28 of the bore 24 provide an engineering fit between the housing 12 and the outer bearing race 44 that fixedly couples the outer bearing race 44 to the housing 12 when the temperature of the assembly 10 is at or below a first predetermined temperature, such as 20 degrees Celsius. The fit between the housing 12 and the outer bearing race 44 can by any type of fit that inhibits relative movement between the outer bearing race 44 and the housing 12, such as an interference fit (e.g., press-fit, driving fit). Also in this example, the inside circumferential surface 54 of the outer bearing race 44 and the outside circumferential surface 60 of the compensation member 20 are sized such that the compensation member 20 does not impede relative movement between the outer bearing race 44 and the housing 12 to a significant degree when the temperature of the assembly 10 is at or below the first predetermined temperature. In the example provided, the inside circumferential surface 54 of the outer bearing race 44 and the outside circumferential surface 60 of the compensation member 20 engage one another in a relatively loose manner, such as through a clearance fit (e.g., close running fit, sliding fit, location fit) or a transition fit (e.g., tight-fit, similar fit).

Due to differences in the first and second coefficients of linear thermal expansion for the first and second materials, respectively, the extent of the fit between the housing 12 and the outer bearing race 44 diminishes as the temperature of the assembly 10 increases to a point (at a second predetermined temperature that is greater than the first predetermined temperature) where the outer circumferential surface 70 of the outer bearing race 44 is disengaged from the circumferentially extending surface 30 of the counterbore portion 28 of the bore 24. However, the increase in the temperature of the assembly 10 also causes the compensation member 20 to grow in diameter. Due to differences in the second and third coefficients of linear thermal expansion for the second and third materials, respectively, the compensation member 20 grows more rapidly in diameter than the outer bearing race 44 as the temperature of the assembly 10 increases between the first and second predetermined temperatures such that the outside circumferential surface 60 of the compensation member 20 is able to grow into engagement with the inside circumferential surface 54 of the outer bearing race 44. An interference fit is provided between the outside circumferential surface 60 of the compensation member 20 and the inside circumferential surface 54 of the outer bearing race 44 when the assembly is at the second predetermined temperature, which is sufficient to fixedly couple the outer bearing race 44 to the compensation member 20. Since the compensation member 20 is fixedly coupled to the housing 12, the fit between the outside circumferential surface 60 of the compensation member 20 and the inside circumferential surface 54 of the outer bearing race 44 has the practical effect of inhibiting relative axial and rotational movement between the outer bearing race 44 and the housing 12 when the temperature is at or above the second predetermined temperature.

While reference to FIG. 5, a second assembly constructed in accordance with the teachings of the present disclosure is generally indicated by reference numeral 10a. The assembly 10a includes first and second bearings 16a and 16b, respectively, that are configured to support a shaft 14a for rotation about a rotational axis 18 relative to a housing 12a. Except as noted below, the housing 12a and the shaft 14 can be substantially similar to the housing 12 and the shaft 14 that are described in detail above.

Each of the first and second bearings 16a and 16b has an outer bearing race 44a that can be configured in a manner that is substantially similar to the outer bearing race 44 that is depicted in FIGS. 1 and 2 and described in detail above. However, the outer bearing races 44a of the first and second bearings 16a and 16b are unitarily and integrally formed with one another (i.e., are fixedly coupled to one another). The assembly 10a further includes a first annular compensation member 20a and a second annular compensation member 20b. The first annular compensation member 20a consists solely of a tubular portion 64a that is integrally and unitarily formed with the housing 12a, while the second annular compensation member 20b is generally identical to the compensation member 20 depicted in FIG. 3.

During the assembly process, the outer bearing races 44a of the first and second bearings 16a and 16b are received into the bore 24a and the outer bearing race 44a of the first bearing 16a is abutted against an annular shoulder 32a of a counterbore portion 28a of the bore 24a. The tubular portion 64a of the first annular compensation member 20a, which is unitarily and integrally formed with (i.e., fixedly coupled to) the housing 12a, is disposed concentric with the inside circumferential surface 54a of the bore 24a. The radially outer surface 68 of the flange 66 of the second annular compensation member 20b can be engaged to a corresponding surface of the bore 24, such as the inside circumferential surface 54a of the bore 24a, in a manner similar to that which is described above. In a manner that is substantially similar to that which is described above, the first and second annular compensation members 20a and 20b cooperate with the housing 12a and the outer bearing races 44a to provide a means for attenuating thermally-induced changes in a fit between the housing 12a and the outer bearing races 44a that result from differences in coefficients of linear thermal expansion of the first and second materials.

While the first annular compensation member 20a has been depicted in this example as being unitarily and integrally formed with the housing 12a, it will be appreciated that the first annular compensation member 20a could be a discrete component that is generally similar to the second annular compensation member 20b. In such a situation, the outer bearing race 44a of the first bearing 16a could be abutted directly against the flange (not shown) of the first annular compensation member 20a and the annular shoulder 32 in the bore 24 may be omitted.

Returning to FIG. 1, annular compensation members 20b, 20c and 20d can be employed in conjunction with bearings 16b, 16c and 16d, respectively, to support a pair of stub shafts 200. The annular compensation members 20b and 20c can be constructed in a manner that is similar to the annular compensation member 20 discussed above. The annular compensation member 20b is sized such that the radially outer surface 68b engages the circumferentially extending surface of a through-bore portion 26b of a bore 24b in a bearing holder 202, while the annular compensation member 20c is sized such that the radially outer surface 68c engages the circumferentially extending surface of a counterbore portion 28c ion the bearing holder 202. The outer bearing races 44b and 44c of the bearings 16b and 16c are received into the counterbore portions 28b and 28c that are formed into the opposite axial ends of the bearing holder 202 such that the outside circumferential surfaces 60b and 60c, respectively, abut or are disposed proximate the inside circumferential surfaces 54b and 54c, respectively of the ribs 52b and 52c, respectively. The bearing holder 202 is received into a bore 206 in the housing 12 and houses the bearings 16b and 16c and the annular compensation members 20b and 20c in this example.

The annular compensation member 20d can be constructed in a manner that is similar to the annular compensation member 20 discussed above. The annular compensation member 20d is sized such that the radially outer surface 68d engages a circumferentially extending surface of a throughbore portion 216 of a bore 206d in the housing 12 that is configured to receive the bearing holder 202d. The outer bearing race 44d of the bearing 16d is received into the counterbore portion 28d that is formed into an axial end of the bearing holder 202d such that the outside circumferential surface 60d of the annular compensation member 20d abuts or is disposed proximate the inside circumferential surface 54d of the rib 52d.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An assembly comprising:
a housing defining a bore;
a first bearing having a first outer bearing race, a first inner bearing race, and a plurality of first rolling elements that are disposed radially between the first outer and first inner bearing races, the first outer bearing race being received in the bore and defining an annular race on which the first rolling elements are rollingly disposed;
a first annular compensation member fixedly coupled to the housing, the first annular compensation member having an outside circumferential surface that is received about an inside circumferential surface of the first outer bearing race;
wherein the housing is formed of a first material having a first coefficient of linear thermal expansion, wherein the first outer bearing race is formed of a second material having a second coefficient of linear thermal expansion, and wherein the first annular compensation member is formed of a third material having a third coefficient of linear thermal expansion; and
(a) wherein a fit between an outside circumferential surface of the first outer bearing race and an inside circumferential surface of the bore in the housing fixedly couples the first outer bearing race to the housing when the temperature of the assembly is at or below a first predetermined temperature, (b) wherein the outside circumferential surface of the first outer bearing race is disengaged from the inside circumferential surface of the bore when the temperature of the assembly is at or above a second predetermined temperature, the second predetermined temperature being greater than the first predetermined temperature, and (c) wherein a fit between the inside circumferential surface of the first outer bearing race and the outside circumferential surface of the first annular compensation member fixedly couples the first outer bearing race to the first annular compensation member when the temperature of the assembly is at or above the second predetermined temperature to thereby inhibit axial and rotational movement of the first outer bearing race relative to the housing.

2. The assembly of claim 1, wherein the first annular compensation member is integrally and unitarily formed with the housing.

3. The assembly of claim 1, wherein the first annular compensation member comprises a tubular portion and a flange, the tubular portion defining the outside circumferential surface of the first annular compensation member, the flange extending radially outwardly from the tubular portion and engaging the housing.

4. The assembly of claim 3, wherein a first portion of the bore into which the first outer bearing race is received and a second portion of the bore into which the flange is received are formed with a common inside diameter.

5. The assembly of claim 1, wherein each of the first and third materials is a non-ferrous material.

6. The assembly of claim 5, wherein each of the first and third materials is an aluminum alloy.

7. The assembly of claim 1, wherein the second material is a steel alloy.

8. The assembly of claim 1, wherein the first rolling elements comprise rollers.

9. The assembly of claim 8, wherein the rollers are tapered.

10. The assembly of claim 1, wherein the first rolling elements comprise spherical balls.

11. The assembly of claim 1, further comprising a shaft that is received through the first inner bearing race, the shaft being supported by the first bearing for rotation relative to the housing about a rotational axis.

12. The assembly of claim 11, further comprising a second bearing having a second outer bearing race, a second inner bearing race, and a plurality of second rolling elements that are disposed radially between the second outer and second inner bearing races, the second outer bearing race being received in the bore and defining a second annular race on which the second rolling elements are rollingly disposed, wherein the first and second outer bearing races are unitarily and integrally formed.

13. The assembly of claim 12, wherein the assembly comprises a second annular compensation member formed of the third material, the second annular compensation member has an outside circumferential surface that is received about an inside circumferential surface of the second outer bearing race, wherein a fit between the inside circumferential surface of the second outer bearing race and the outside circumferential surface of the second annular compensation member fixedly couples the second outer bearing race to the second annular compensation member when the temperature of the assembly is at or above the second predetermined temperature to thereby inhibit axial and rotational movement of the second outer bearing race relative to the housing.

14. The assembly of claim 13, wherein the second outer bearing race comprises a circumferentially extending rib that is disposed radially outward of the second annular race and wherein the inside circumferential surface of the second outer bearing race is formed on the circumferentially extending rib.

15. The assembly of claim 1, wherein the first outer bearing race comprises a circumferentially extending rib that is disposed radially inward of the first annular race and wherein the inside circumferential surface of the first outer bearing race is formed on the circumferentially extending rib.

16. The assembly of claim 1, wherein a ratio of the first coefficient of linear thermal expansion to the second coefficient of linear thermal expansion is greater than or equal to 1.75.

17. The assembly of claim 1, wherein a ratio of the third coefficient of linear thermal expansion to the first coefficient of linear thermal expansion is within a range of 0.9 to 1.1.

18. An assembly comprising:
a housing formed of a first material, the housing defining a bore;
a bearing formed of a second material that is different from the first material, the bearing having an outer bearing race, an inner bearing race, and a plurality of rolling elements that are disposed radially between the outer and inner bearing races, the outer bearing race being received in the bore and defining an annular race on which the rolling elements are rollingly disposed;
a circumferentially extending rib that is unitarily and integrally formed with the outer bearing race; and
an annular compensation member that is fixedly coupled to the housing and having a portion that is disposed about the circumferentially extending rib, wherein the portion of the annular compensation member is configured to grow into contact with an interior circumferential surface of the outer bearing race due to thermal expansion when a temperature of the assembly increases from a first predetermined temperature to a second predetermined temperature.

19. The assembly of claim 18, wherein the annular compensation member is formed of a third material and wherein each of the first and third materials is a non-ferrous material.

20. The assembly of claim 19, wherein each of the first and third materials is an aluminum alloy.

21. The assembly of claim 18, wherein the second material is a steel alloy.

22. The assembly of claim 18, wherein the rolling elements comprise rollers or spherical balls.

* * * * *